United States Patent
Mehas et al.

(10) Patent No.: US 7,453,251 B1
(45) Date of Patent: Nov. 18, 2008

(54) VOLTAGE TRACKING REFERENCE FOR A POWER REGULATOR

(75) Inventors: Gustavo J. Mehas, Sunnyvale, CA (US); James W. Leith, Seattle, WA (US); Shying D. Chen, Tigard, OR (US)

(73) Assignee: Intersil Americas Inc., Milpitas, CA (US)

( * ) Notice: Subject to any disclaimer, the term of this patent is extended or adjusted under 35 U.S.C. 154(b) by 343 days.

(21) Appl. No.: 11/333,475

(22) Filed: Jan. 17, 2006

Related U.S. Application Data

(60) Provisional application No. 60/644,842, filed on Jan. 18, 2005.

(51) Int. Cl.
*G05F 1/00* (2006.01)
(52) U.S. Cl. .................. 323/299; 323/901; 363/49
(58) Field of Classification Search ............. 323/299, 323/901, 288, 301, 282; 363/49
See application file for complete search history.

(56) References Cited

U.S. PATENT DOCUMENTS

| | | | | |
|---|---|---|---|---|
| 5,781,000 A | * | 7/1998 | Saeki et al. | ........ 323/234 |
| 5,783,935 A | * | 7/1998 | Kyung | ........ 323/313 |
| 5,917,313 A | * | 6/1999 | Callahan, Jr. | ........ 323/288 |
| 6,538,417 B2 | * | 3/2003 | Marty et al. | ........ 323/282 |
| 6,969,977 B1 | * | 11/2005 | Smith | ........ 323/222 |
| 6,998,829 B2 | * | 2/2006 | Solie | ........ 323/288 |

OTHER PUBLICATIONS

National Semiconductor, LM31700 Datasheet, Jun. 2004, p. 3.*

\* cited by examiner

*Primary Examiner*—Jeffrey L. Sterrett
*Assistant Examiner*—Harry Behm
(74) *Attorney, Agent, or Firm*—Gary R Stanford

(57) ABSTRACT

A control circuit for a PWM switching power regulator including an error amplifier and an amplifier filter circuit. The error amplifier has a first input receiving a reference signal, a second input receiving an output sense signal, and an output providing a compensation signal used to control PWM switching. The amplifier filter circuit has an input receiving a ratio-metric tracking signal and an output providing the reference signal to the input of the error amplifier. The control circuit may include a resistive voltage divider for providing the tracking signal. The amplifier filter circuit may be implemented as a transconductance amplifier having an input receiving the tracking signal and an output coupled to a capacitor. The transconductance amplifier may have a relatively small current drive capacity and its output may have a relatively slow and weak response to changes of the tracking signal.

15 Claims, 2 Drawing Sheets

VOLTAGE TRACKING REFERENCE FOR A POWER REGULATOR

CROSS-REFERENCE TO RELATED APPLICATIONS

This application claims the benefit of U.S. Provisional Application Ser. No. 60/644,842, filed on Jan. 18, 2005, which is herein incorporated by reference for all intents and purposes.

BACKGROUND OF THE INVENTION

1. Field of the Invention

The present invention relates to power regulators, and more particularly to a power controller with an improved voltage tracking reference to prevent latch up without compromising inrush current.

2. Description of the Related Art

The power supply requirements of various chipsets include specific sequencing to prevent latch up. One type of requirement is known as ratio-metric tracking, in which the output of the power converter tracks the voltage of the main supply rail up to a desired point, and then begins regulation at that voltage level. In many conventional tracking configurations, the tracking input was coupled directly to the compensation loop of the power controller chip, such as via an additional input of the error amplifier. In such configurations, a relatively large change in voltage per unit time (DV/DT) of the main supply rail was otherwise coupled directly via a proportionate tracking voltage to the compensation loop via the error amplifier. Without compensation, such tracking voltage variations potentially caused large jumps in output voltage, which otherwise requires a large amount of input current. Such "inrush current" can potentially cause the input supply to collapse or cause damage to components on the board.

Conventional tracking configurations added an RC filter or the like to the input of a tracking reference to prevent noise injections and some moderate DV/DT disruptions. In the conventional configurations, excessive DV/DT disruptions still posed a threat of compromising inrush current specifications, resulting in output regulation disruption and even latchup and malfunction or damage. Any high frequency noise on the tracking reference pin could directly enter the error amplifier and cause disruption of the output regulation. Further, the conventional designs required at least an extra capacitor to filter the tracking reference pin.

SUMMARY OF THE INVENTION

A control circuit for a pulse width modulation (PWM) switching power regulator which converts an input voltage to an output voltage according to an embodiment of the present invention includes an error amplifier and an amplifier filter circuit. The error amplifier has a first input receiving a first reference signal, a second input receiving an output sense signal, and an output providing a compensation signal used to control PWM switching of the PWM switching power regulator. The amplifier filter circuit has a first input receiving a ratio-metric tracking signal and an output providing the first reference signal to the input of the error amplifier.

The control circuit may include a resistive voltage divider for coupling to the input voltage to provide the ratio-metric tracking signal. The amplifier filter circuit may be implemented as a transconductance amplifier having a first input receiving the ratio-metric tracking signal and an output and a capacitor coupled to the output of the transconductance amplifier. In one configuration, the transconductance amplifier has a relatively small current drive capacity and its output has a relatively slow response to changes of the ratio-metric tracking signal. The transconductance amplifier may further include a second input receiving a second reference signal. In this latter case, the transconductance amplifier drives the first reference signal based on whichever of the second reference signal and the ratio-metric tracking signal has a lower voltage level.

In one embodiment, the error amplifier and the amplifier filter circuit are integrated onto a controller integrated circuit. The controller integrated circuit may further include an external reference pin for receiving an external reference signal and a switch. The switch has a first switched input coupled to the external reference pin, a second switched input receiving an internal reference signal, and an output providing a second reference signal which is a selected one of the internal and external reference signals. In this case, the amplifier filter circuit has a second input receiving the second reference signal. The amplifier filter circuit may be implemented as a transconductance amplifier having first and second inputs diode-coupled together at a differential input stage. The output of the transconductance amplifier may be coupled to a soft-start pin of the controller integrated circuit.

A power regulator according to an embodiment of the present invention includes a switching converter, a feedback circuit, an error amplifier, PWM logic, a switching circuit and isolation and filter circuit. The switching converter converts an input voltage to an output voltage based on at least one drive signal. The feedback circuit has an input sensing the output voltage and an output providing a feedback voltage. The error amplifier has a first input receiving the feedback voltage, a second input receiving a first reference voltage signal, and an output providing a compensation signal. The PWM logic has an input receiving the compensation signal and an output providing a PWM signal indicative of the compensation signal compared with a periodic waveform. The switching circuit has an input receiving the PWM signal and an output providing the at least one drive signal. The isolation and filter circuit has a first input receiving a tracking voltage indicative of the input voltage and an output providing the first reference voltage signal to the second input of the error amplifier.

In one embodiment, the isolation and filter circuit includes a transconductance amplifier and a capacitor. The transconductance amplifier has a first input receiving the tracking voltage and an output providing the first reference voltage signal, where the capacitor is coupled to the output of the transconductance amplifier. The isolation and filter circuit may include a second input receiving a second reference voltage signal. The isolation and filter circuit may include first and second input transistors coupled together to form a diode OR'd input with first and second base electrodes. In this latter configuration, the second reference voltage signal is provided to the first base electrode and the tracking voltage is provided to the second base electrode.

The power regulator may further include a switch for selecting between third and fourth reference voltage signals to provide the second reference voltage signal. The power regulator may further include a tracking circuit coupled to the input voltage and having an intermediate node providing the tracking voltage.

A method of providing ratio-metric tracking according to an embodiment of the present invention for a power regulator which converts an input voltage to an output voltage includes providing an error amplifier in a compensation loop of the regulator which compares an output sense voltage with a first reference voltage for generating an error signal, receiving a tracking voltage indicative of the input voltage, and isolating and filtering the tracking voltage to provide the first reference voltage.

The method may include providing a voltage divider to divide the input voltage. The method may include providing the tracking voltage to a first input of a transconductance amplifier with limited output drive capacity, and capacitively coupling the output of the transconductance amplifier. The method may include providing a second reference voltage to a second input of the transconductance amplifier, and selecting the lesser of the second reference voltage and the tracking voltage for controlling the output of the transconductance amplifier.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
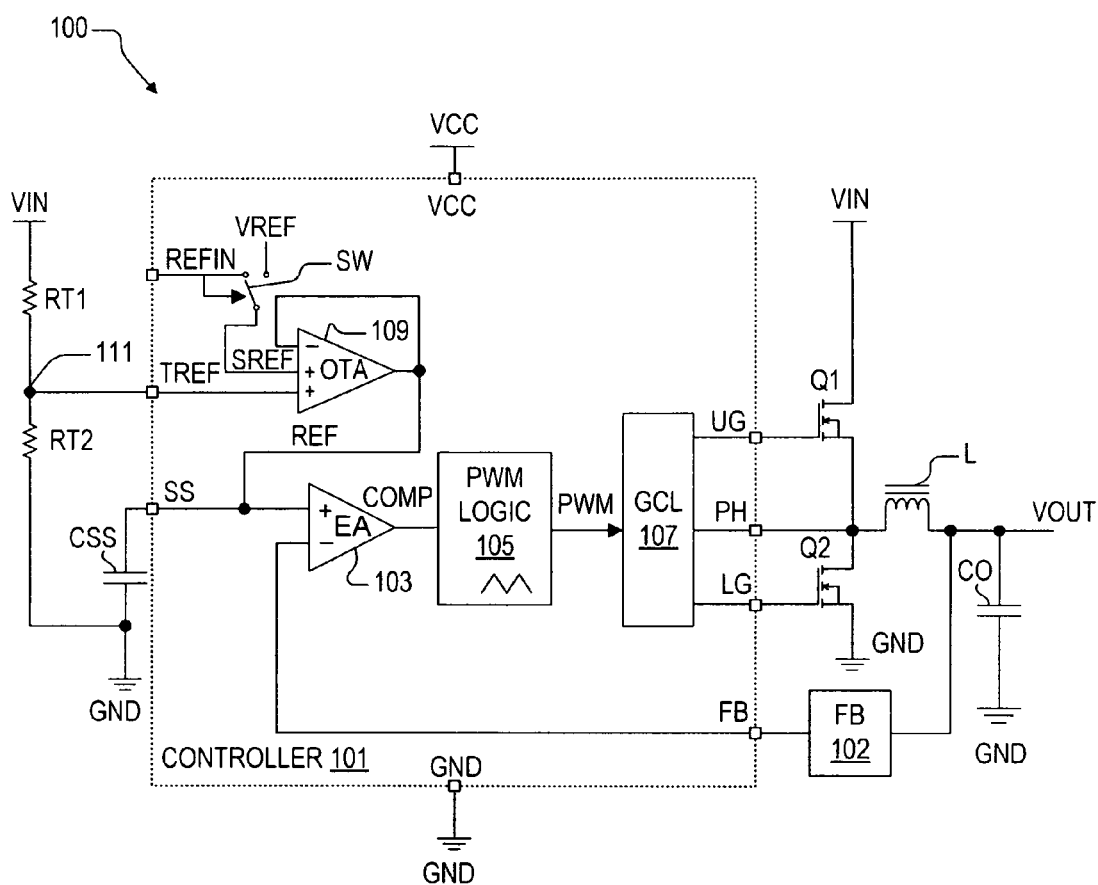
FIG. 1 is a simplified schematic and block diagram of a DC-DC converter including a controller implemented according to an exemplary embodiment of the present invention.

FIG. 1 is a simplified schematic and block diagram of a DC-DC converter 100 including a controller 101 implemented according to an exemplary embodiment of the present invention. The controller 101 is shown using a dotted line along its periphery with input, output or input/output (I/O) pins shown along the dotted line. In one embodiment, the controller 101 is configured as an integrated circuit (IC) or chip or the like, although other configurations are contemplated, such as discrete logic or the like. The DC-DC converter 100 is shown as a buck-type converter for purposes of illustration, although it is understood that the present invention is equally applicable to other types of power converters or power regulators. A pair of switches Q1 and Q2 are coupled in series between respective terminals of an input source voltage, shown as VIN and ground (GND). A single ground signal GND is shown, where it is understood that multiple ground signals may be employed, such as, for example, separate signal and power grounds. In the embodiment shown, the switches Q1 and Q2 are implemented as N-channel metal-oxide semiconductor, field-effect transistors (MOSFETs), although other types of electronic switches are contemplated including semiconductor switches suitable for integrated circuit (IC) fabrication. The upper switch Q1 has its drain coupled to VIN, its gate coupled to an upper gate (UG) pin of the controller 101, and its source coupled to the drain of the lower switch Q2 at a phase (PH) pin of the controller 101. The lower switch Q2 has its drain coupled to the source of Q1 and to one end of an output inductor L, and has its source coupled to GND. The other end of the inductor L is coupled to an output node that develops an output signal VOUT. The output node is coupled to one end of an output capacitor CO, having its other end coupled to GND. The VOUT signal is fed back through a feedback (FB) circuit 102 to an FB pin of the controller 101.

The controller 101 includes an error amplifier 103, PWM logic 105, gate control logic (GCL) 107 and an operational transconductance amplifier (OTA) 109, and receives power from a source voltage VCC provided across a source voltage pin VCC and a GND pin. The error amplifier 103 has a non-inverting or positive (+) input coupled to a soft start (SS) pin, which is coupled through a soft start capacitor CSS to GND. The error amplifier 103 has an inverting or negative (−) input coupled to the FB pin, and generates a compensation signal COMP at its output, which is provided to the PWM logic 105. The FB pin is a means for sensing the output voltage VOUT, although alternative methods are contemplated for sensing the output. Although not shown, the COMP signal may be provided via a compensation pin to an external compensation circuit coupled to the FB pin for compensation and stability purposes as known to those skilled in the art. The PWM logic 105 includes an oscillator or the like and a comparator and other circuitry (not shown), which collectively compare the COMP signal with a periodic waveform (e.g., ramp signal, triangular signal, etc.) to generate a pulse-width modulation (PWM) signal as known to those skilled in the art. The PWM signal is provided to the GCL 107, which asserts an upper gate signal on the UG pin to control the switch Q1 and a lower gate signal on the LG pin to control the switch Q2. During each PWM cycle, the GCL 107 selectively (e.g., alternatively) toggles the switches Q1 and Q2 and to selectively couple the input voltage VIN through the output inductor L to control VOUT.

The controller 101 has an external reference input pin (REFIN) coupled to one switched terminal of a single-pole, double-throw (SPDT) switch SW. The other switched terminal of the switch SW is coupled to an internal reference voltage VREF. VREF is typically on the order of several tenths of a Volt (V), such as 0.4 V or 0.6 V or the like, although any voltage reference level is contemplated. The common pole of the switch SW is a selected system voltage reference signal SREF, which is provided to a first non-inverting input of the OTA 109. SREF is a selected one of the VREF and REFIN signals depending upon the state of the switch SW. REFIN is also provided as the control input to the switch SW. As shown, upon enable of the controller 101, if REFIN is not within a predetermined voltage offset (e.g., 1.4V) relative to VCC, then the REFIN is selected as the system reference SREF instead of VREF. Otherwise, the internal voltage reference VREF is selected as SREF. The SREF signal is provided to the input of the OTA 109.

A tracking reference pin TREF is coupled to a second non-inverting input of the OTA 109, which has an inverting or negative (−) input coupled to its output and to the non-inverting input of the error amplifier 103. The output of the OTA 109 develops a reference signal REF. A pair of voltage divider resistors RT1 and RT2 are coupled between the input voltage VIN and GND signals. The intermediate junction between the resistors RT1 and RT2, shown as node 111, is coupled to the TREF pin. In this manner, a portion of the voltage level of VIN (where the VIN portion is defined by the relative values of the resistors RT1 and RT2) is provided to the input of the OTA 109, where VIN is the input supply rail and TREF is the tracking voltage. The OTA 109 converts a differential input voltage to an output current, which is used to charge the capacitor CSS to develop the REF signal. The OTA 109 has a relatively small drive capacity and this has a relatively slow and weak output. In one embodiment, it has a 30 microampere (μA) output driver capability and is slew-rate limited by the capacitor CSS.

In operation, the voltage of TREF at node 111 follows the generally rising level of VIN at startup or reset. In this manner, TREF is a ratio-metric tracking signal for tracking the voltage of the supply rail or input voltage. The TREF signal is diode ORed with the SREF signal at the input of the OTA 109 (i.e., either REFIN or VREF as selected by the switch SW). When TREF is below SREF, the output of the OTA 109 is regulated at the voltage level of TREF. The TREF level is provided to the input of the error amplifier 103 through the limited drive output of the OTA 109 and the soft start capacitor decoupling (slew rate limiting). The capacitor CSS is a user-selected capacitor, and is typically in the range of tenths of μFarads (e.g., 0.1 μF). When the TREF voltage exceeds SREF, then SREF becomes dominant and the output of the OTA 109 is regulated at the voltage level of SREF. In this manner, the output of the OTA 109 is regulated based on whichever of the TREF and SREF signals has the lower voltage.

Figure 2:
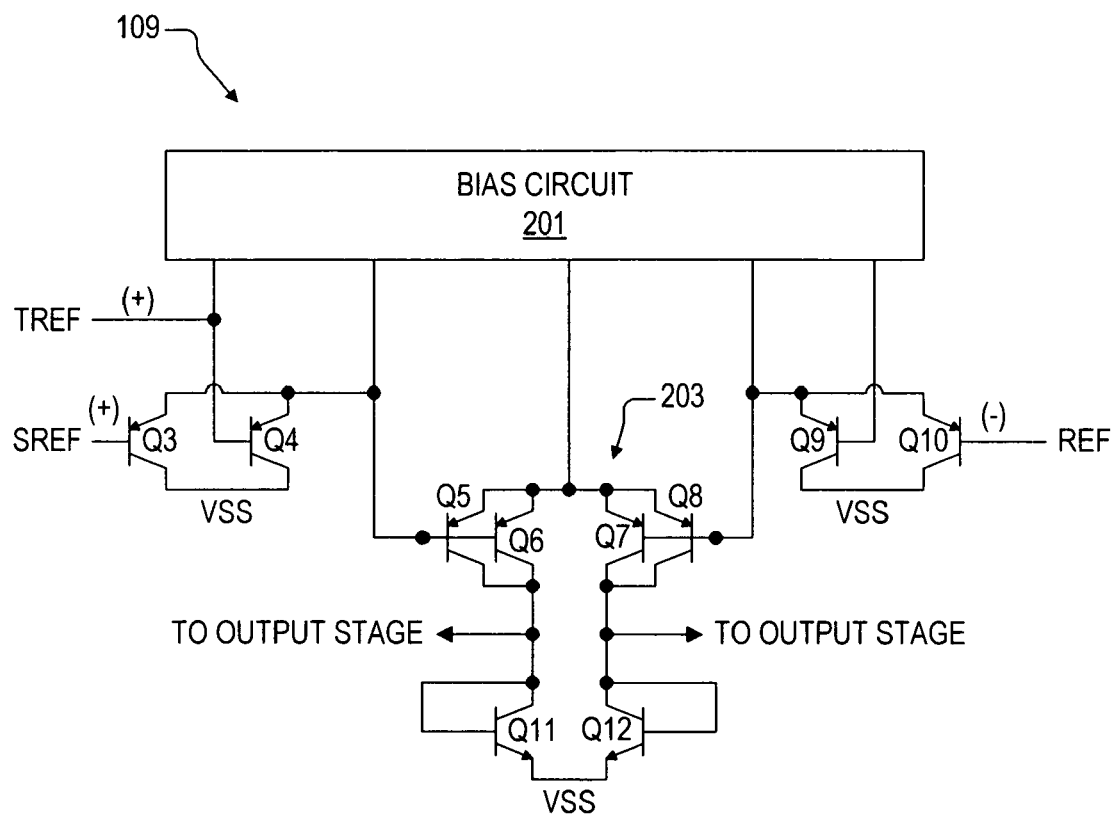
FIG. 2 is a simplified schematic and block diagram illustrating a portion of the input stage of the OTA of FIG. 1.

FIG. 2 is a simplified schematic and block diagram illustrating a relevant portion of the OTA 109. SREF is provided to the base electrode of a first PNP bipolar transistor Q3 and TREF is provided to the base electrode of another PNP bipolar transistor Q4, where the base of Q4 is also coupled to a terminal of a bias circuit 201. The bias circuit 201 performs biasing functions as known to those skilled in the art is not further described. The collectors of Q3 and Q4 are coupled together and to VSS, which is effectively coupled to GND or some other appropriate DC reference voltage. The emitters of Q3 and Q4 are coupled together and provided to another terminal of the bias circuit 201, and to the bases of another pair of PNP bipolar transistors Q5 and Q6. Q5 and Q6 form half of a differential input stage 203, which further includes another pair of PNP bipolar transistors Q7 and Q8. The emitters of Q5-Q8 are coupled together and to another terminal of the bias circuit 201. The bases of Q7 and Q8 are coupled together. The collectors of Q5 and Q6 are coupled together and to the collector of a diode-coupled NPN bipolar transistor Q11. The base of Q1 is coupled to its collector, and its emitter is coupled to VSS (optionally via a trim resistor). The collectors of Q7 and Q8 are coupled together and to the collector of another diode-coupled NPN bipolar transistor Q12. The base of Q12 is coupled to its collector, and its emitter is coupled to VSS (optionally via a trim resistor). The inverting input of the OTA 109 is coupled to its output which provides the REF signal, so that REF is shown provided to the base of another PNP bipolar transistor Q10 at the negative input (−) of the OTA 109. The emitter of Q10 is coupled to the emitter of another PNP bipolar transistor Q9, to another terminal of the bias circuit 201, and to the bases of the transistors Q7 and Q8. The collectors of Q9 and Q10 are coupled together and to VSS, and the base of Q9 is coupled to another terminal of the bias circuit 201. The collectors of Q11 and Q12 form a differential signal which is provided to an output stage (not shown), which may be implemented as an OTA push-pull output stage as known to those skilled in the art.

The controller 101, which is implemented according to an exemplary embodiment of the present invention, provides ratio-metric tracking capabilities without compromising the inrush current specification that can occur with conventional configurations. In conventional configurations, the VINsignal is used to develop a tracking signal, which was provided directly to another input of the error amplifier 103. For the controller 101, the ratio-metric tracking signal TREF is instead coupled to an additional input of the OTA 109. The OTA 109 provides isolation and extra filtering of TREF thereby preventing large inrush current surges that can occur due to the interaction of rapid DV/DT of TREF. The combination of the OTA 109 and the capacitor CSS forms an isolation and filter circuit which provides the benefit of filtering DV/DT excursions on TREF and thereby preventing potentially large output voltage changes that would otherwise result. Since the OTA 109 has a limited drive capability (e.g., 30 μA) charging a relatively large capacitor CSS (0.1 μF), changes in the TREF voltage are sufficiently filtered by the OTA 109 and CSS capacitor combination. The capacitor CSS is chosen by a user to be custom tailored to the needs of the particular application.

An additional benefit of using an OTA 109 to filter TREF is that the error amplifier 103, which is in the compensation loop of the converter 100, is isolated from high frequency noise on TREF. In particular, in contrast with conventional configurations, there is no direct path in the controller 101 from the TREF input to the noise sensitive error amplifier 103, resulting in additional noise isolation and superior performance. Yet another benefit of coupling TREF to an input of the OTA 109 is an overall Build of Materials (BOM) reduction in the number of components and associated cost. In particular, the additional capacitor (and optional resistor) used in conventional configurations to filter TREF to prevent latchup are eliminated.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention as defined by the following claims.

What is claimed is:

1. A control circuit for a pulse width modulation (PWM) switching power regulator which converts an input voltage to an output voltage, comprising:
    an error amplifier having a first input receiving a first reference signal, a second input receiving an output sense signal, and an output providing a compensation signal used to control PWM switching of the PWM switching power regulator;
    a transconductance amplifier having an inverting input, a first non-inverting input receiving a ratio-metric tracking signal based on the input voltage a second non-inverting input receiving a second reference signal and an output coupled to said inverting input and providing said first reference signal to said input of said error amplifier;
    wherein said transconductance amplifier drives the first reference signal based on whichever of said second reference signal and said ratio-metric tracking signal has a lower voltage level; and
    a capacitor coupled to said output of said transconductance amplifier.

2. The control circuit of claim 1, further comprising a resistive voltage divider for coupling to the input voltage to provide said ratio-metric tracking signal.

3. The control circuit of claim 1, wherein said transconductance amplifier has a relatively small current drive capacity and wherein said output of said transconductance amplifier has a relatively slow response to changes of said ratio-metric tracking signal.

4. The control circuit of claim 1, wherein said error amplifier and said amplifier filter circuit are integrated onto a controller integrated circuit.

5. The control circuit of claim 4, wherein said controller integrated circuit further comprises:
an external reference pin for receiving an external reference signal;
a switch having a first switched input coupled to said external reference pin, a second switched input receiving an internal reference signal, and an output providing a second reference signal comprising a selected one of said internal and external reference signals; and
said amplifier filter circuit having a second input receiving said second reference signal.

6. The control circuit of claim 1, wherein said first and second non-inverting inputs of said transconductance amplifier are diode ORed together at a differential input stage.

7. The control circuit of claim 6, wherein said output of said transconductance amplifier is coupled to a soft-start pin of said controller integrated circuit.

8. The control circuit of claim 4, wherein said controller integrated circuit further comprises:
PWM logic having an input receiving said compensation signal and an output providing a PWM signal; and
gate control logic having an input receiving said PWM signal, a first output providing an upper gate signal to an upper gate pin and a second output providing a lower gate signal to a lower gate pin.

9. A power regulator, comprising:
a switching converter which converts an input voltage to an output voltage based on at least one drive signal;
a feedback circuit having an input sensing said output voltage and an output providing a feedback voltage;
an error amplifier having a first input receiving said feedback voltage, a second input receiving a first reference voltage signal, and an output providing a compensation signal;
pulse width modulation (PWM) logic having an input receiving said compensation signal and an output providing a PWM signal indicative of said compensation signal compared with a periodic waveform;
a switching circuit having an input receiving said PWM signal and an output providing said at least one drive signal;
a transconductance amplifier having an inverting input, a first non-inverting input receiving a tracking voltage indicative of said input voltage, a second non-inverting input receiving a second reference voltage, and an output coupled to said inverting input and providing said first reference voltage signal to said second input of said error amplifier; and
wherein said transconductance amplifier drives said first reference voltage signal based on whichever of said second reference voltage and said tracking voltage has a lower voltage level.

10. The power regulator of claim 9, wherein said first and second non-inverting inputs of said transconductance amplifier comprise first and second input transistors coupled together to form a diode OR'd input with first and second base electrodes, wherein said second reference voltage signal is provided to said first base electrode and wherein said tracking voltage is provided to said second base electrode.

11. The power regulator of claim 9, further comprising a switch selecting between third and fourth reference voltage signals as said second reference voltage signal provided to said second input of said transconductance amplifier.

12. The power regulator of claim 9, further comprising a tracking circuit coupled to said input voltage and having an intermediate node providing said tracking voltage.

13. A method of providing ratio-metric tracking for a power regulator which converts an input voltage to an output voltage, said method comprising:
providing an error amplifier in a compensation loop of the regulator which compares an output sense voltage with a first reference voltage for generating an error signal;
receiving a tracking voltage indicative of the input voltage;
providing the tracking voltage to a first non-inverting input of a transconductance amplifier which has an output with limited output drive capacity providing the first reference voltage;
providing a second reference voltage to a second non-inverting input of the transconductance amplifier;
coupling an inverting input to the output of the transconductance amplifier;
capacitively coupling the output of the transconductance amplifier; and
configuring the transconductance amplifier to select the lesser of the second reference voltage and the tracking voltage for controlling the output of the transconductance amplifier.

14. The method of claim 13, wherein said receiving a tracking voltage comprises providing a voltage divider to divide the input voltage.

15. The method of claim 13, further comprising:
configuration the transconductance amplifier with limited output drive capacity.

\* \* \* \* \*